(12) United States Patent
Huang et al.

(10) Patent No.: US 8,896,498 B2
(45) Date of Patent: Nov. 25, 2014

(54) DISPLAY AND DISPLAY ASSEMBLY

(75) Inventors: Sheng-Bei Huang, Hsinchu (TW); Ming-Yu Wu, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 187 days.

(21) Appl. No.: 13/227,005

(22) Filed: Sep. 7, 2011

(65) Prior Publication Data
US 2012/0280891 A1 Nov. 8, 2012

(30) Foreign Application Priority Data

May 5, 2011 (TW) .............................. 100115826 A

(51) Int. Cl.
*G09G 5/00* (2006.01)
*G09F 9/00* (2006.01)
*H05K 5/02* (2006.01)
*G02F 1/1333* (2006.01)

(52) U.S. Cl.
CPC ............ *H05K 5/02* (2013.01); *G02F 1/133308* (2013.01); *G02F 1/13336* (2013.01); *Y10S 345/903* (2013.01); *Y10S 345/905* (2013.01)
USPC ....... 345/1.3; 345/903; 345/905; 361/679.01; 379/428.01

(58) Field of Classification Search
CPC ...................................................... G09G 5/00
USPC .................. 345/1.1–1.3; 361/679.01–679.55
See application file for complete search history.

(56) References Cited

U.S. PATENT DOCUMENTS

| 7,355,562 B2 * | 4/2008 | Schubert et al. ................ 345/1.3 |
| 7,823,308 B1 * | 11/2010 | Munson et al. ................. 40/564 |
| 2009/0021127 A1 | 1/2009 | Miller et al. |

OTHER PUBLICATIONS

Taiwan Patent Office, "Office Action", Jan. 28, 2014.

* cited by examiner

*Primary Examiner* — Ryan A Lubit
*Assistant Examiner* — Paras D Karki
(74) *Attorney, Agent, or Firm* — WPAT, PC; Justin King

(57) ABSTRACT

A display includes a frame component, a display module, a first outer frame and a second outer frame. The frame component includes a first side and a second side. The display module is configured on the frame component. The first outer frame is configured at the second side, while the second outer frame is configured at the first side. The length of the second outer frame is shorter than or equal to the length of the first side, so that the two sides of the second outer frame are adapted without exceeding the two ends of the first side. By means of such a design structure, two displays may be connected into a display assembly with a larger display area. When connecting two displays, the first outer frames are able to be removed and the second sides of the two displays are inclined close to each other.

12 Claims, 20 Drawing Sheets

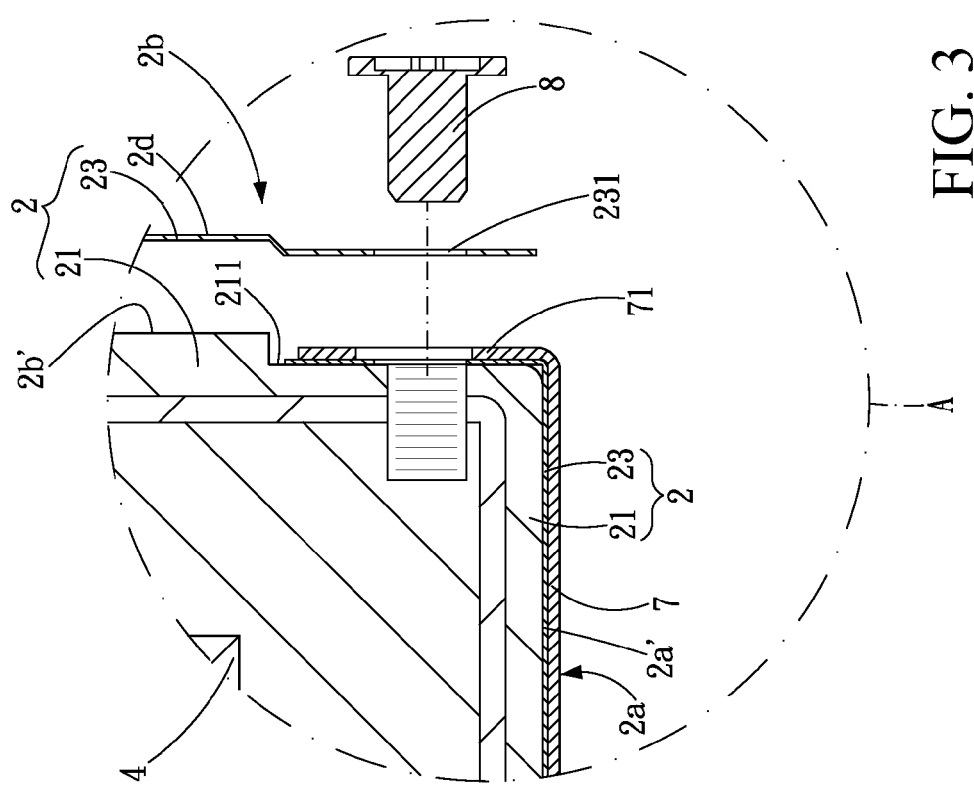

DISPLAY AND DISPLAY ASSEMBLY

CROSS-REFERENCES TO RELATED APPLICATIONS

This non-provisional application claims priority under 35 U.S.C. §119(a) on Patent Application No. 100115826 filed in Taiwan, R.O.C. on 2011 May 5, the entire contents of which are hereby incorporated by reference.

BACKGROUND

1. Technical Field

The disclosure relates to a display, and more particularly to a display and a display set with extreme narrow frame borders.

2. Related Art

Liquid Crystal Displays (LCDs), with a compact structure and low power consumption, are broadly applied to various digital electrical products. Commonly seen in daily life, from smaller LCDs used on mobile phones, digital video cameras, digital cameras and Personal Digital Assistants, to larger LCDs used on notebook computers and personal computers, LCDs have undoubtedly become the mainstream medium in the display market.

A LCD usually includes a panel module and several frame parts. These frame parts form a hollow rectangular frame structure to fasten the panel module and protect outer edges and internal control circuits of the panel module from damage during user operation.

Accompanying business activities in warming markets, multiple LCDs are increasingly aligned into a large matrix type display set, so as to strengthen consumer impressions of certain advertised objects, goods and services by increasing the consumer's visual and aural contact with the products. Such a display set is formed by connecting multiple LCDs into a display wall, which is not only able to display a large complete image but also able to display several identical images at the same time. However, since every LCD is surrounded by a rectangular frame, the image displayed on such display wall is still split by the frame borders when LCDs are connected into the display wall, apparently affecting the integrity of the image. As a result, determining how to change the frame structures of a display so as to provide narrow frame borders, and making the borders lighter and thinner to reduce the visual effects while connecting multiple displays in a display wall, has become a major issue.

SUMMARY

Accordingly, a display is provided in an embodiment which includes a frame component, a display module, a first outer frame and a second outer frame. The frame component has a first side and a second side; the first side has a tiled length. The display module is configured on the frame component. The first outer frame is configured at the second side of the frame component. The second outer frame is configured at the first side of the frame component. A length of the second outer frame is shorter than or equal to the tiled length; and an end of the second outer frame close to the second side is adapted without exceeding an edge surface of the frame component at the second side. When one display is connected to another with the first outer frames removed respectively, the second sides of the two displays are inclined close to each other.

In another embodiment, a display assembly includes multiple displays; each of the displays includes a frame component, a display module, a first outer frame and a second outer frame. The frame component includes a first side and a second side; the first side has a tiled length. The display module is configured on the frame component. The first outer frame is configured at the second side of the frame component; the second side of one of the displays is inclined close to another second side of another one of the displays when the first outer frame is removed from the second side. The second outer frame is configured at the first side of the frame component. The length of the second outer frame is shorter than or equal to the tiled length thereby an end of the second outer frame close to the second side is adapted without exceeding the an edge surface of the frame component at the second side.

In another embodiment, a display includes a frame component, a display module, a first outer frame and a second outer frame. The frame component has a first side, a second side and a first recess; the first recess is located at a lateral end of the second side. The display module is configured on the frame component. The first outer frame is configured at the second side of the frame component. The second outer frame is configured at the first side of the frame component; an end of the second outer frame close to the second side is adapted without exceeding an edge surface of the frame component at the second side. When one display is connected to another with the first outer frames removed respectively, the second sides of the two displays are inclined close to each other.

In another embodiment, a display assembly includes multiple displays; each of the displays includes a frame component, a display module, a first outer frame and a second outer frame. The frame component includes a first side, a second side and a first recess; the first recess is located at a lateral end of the second side. The display module is configured on the frame component. The first outer frame is configured at the second side of the frame component; the second side of one of the displays is inclined close to another second side of another one of the displays with the first recess of the one of the displays corresponding to another first recess of the another one of the displays when the first outer frame is removed from the second side. The second outer frame is configured at the first side of the frame component; an end of the second outer frame close to the second side is adapted without exceeding the an edge surface of the frame component at the second side.

In another embodiment, a display includes a frame component, a display module, a first outer frame and a second outer frame. The frame component has a first side and a second side; the first side has a tiled length. The display module is configured on the frame component. The first outer frame is configured at the first side of the frame component. The length of the first outer frame is shorter than or equal to the tiled length, thereby an end of the first outer frame close to the second side is adapted without exceeding an edge surface of the frame component at the second side. The second outer frame is configured at the second side of the frame component. The second outer frame includes an inserting part inserted between the first outer frame and the frame component. When one display is connected to another with the second outer frames removed respectively, the second sides of the two displays are inclined close to each other.

In another embodiment, a display assembly includes multiple displays; each of the displays includes a frame component, a display module, a first outer frame and a second outer frame. The frame component has a first side and a second side, the first side includes a tiled length. The display module is configured on the frame component. The first outer frame is configured at the first side of the frame component. The length of the first outer frame is shorter than or equal to the tiled length, thereby an end of the first outer frame close to the second side is adapted without exceeding an edge surface of the frame component at the second side. The second outer frame is configured at the second side of the frame component. The second outer frame includes an inserting part inserted between the first outer frame and the frame component. When the second outer frame is removed from the second side, the second side of one of the displays is inclined close to another second side of another one of the displays.

In another embodiment, a display includes a frame component, a first outer frame and a second outer frame. The frame component has a first side, a second side and a first recess; the first recess is located at a lateral end of the second side. The first outer frame is configured at the first side of the frame component; an end of the first outer frame close to the second side is located inside the first recess without exceeding an edge surface of the frame component at the second side. The second outer frame is configured at the second side of the frame component. The second outer frame includes an inserting part inserted inside the first recess. When a display is connected to one another with the second outer frames removed respectively, the second sides of the two displays are inclined close to each other.

In another embodiment, a display assembly includes multiple displays; each of the displays includes a frame component, a display module, a first outer frame and a second outer frame. The frame component has a first side, a second side and a first recess; the first recess is located at a lateral end of the second side. The display module is configured on the frame component. The first outer frame is configured at the first side of the frame component; an end of the first outer frame close to the second side is located inside the first recess without exceeding an edge surface of the frame component at the second side. The second outer frame is configured at the second side of the frame component. The second outer frame has an inserting part inserted inside the first recess. The second side of one of the displays is inclined close to another second side of another one of the displays with the first recess of the one of the displays corresponding to another first recess of the another one of the displays when the second outer frame is removed from the second side.

According to these embodiments, the first outer frame or the second outer frame at the second side of each of the displays is able to be removed in order to connect multiple displays into a display assembly, effectively reducing the thickness between two adjacent displays. In other words, the disclosed embodiments reduce the thickness of the first outer frame or the second outer frame two times less than conventional structures, in order to obtain extreme narrow frame borders. Furthermore, a user is able to remove the first outer frame or the second outer frame according to the connection requirements, allowing greater flexibility and variety when connecting displays into a display assembly.

BRIEF DESCRIPTION OF THE DRAWINGS

The disclosure will become more fully understood from the detailed description given below for the purpose of illustration only, and thus not limitative of the disclosure, wherein:

FIG. 3 is an enlarged view of portion A in FIG. 2A;

DETAILED DESCRIPTION

Figure 1:
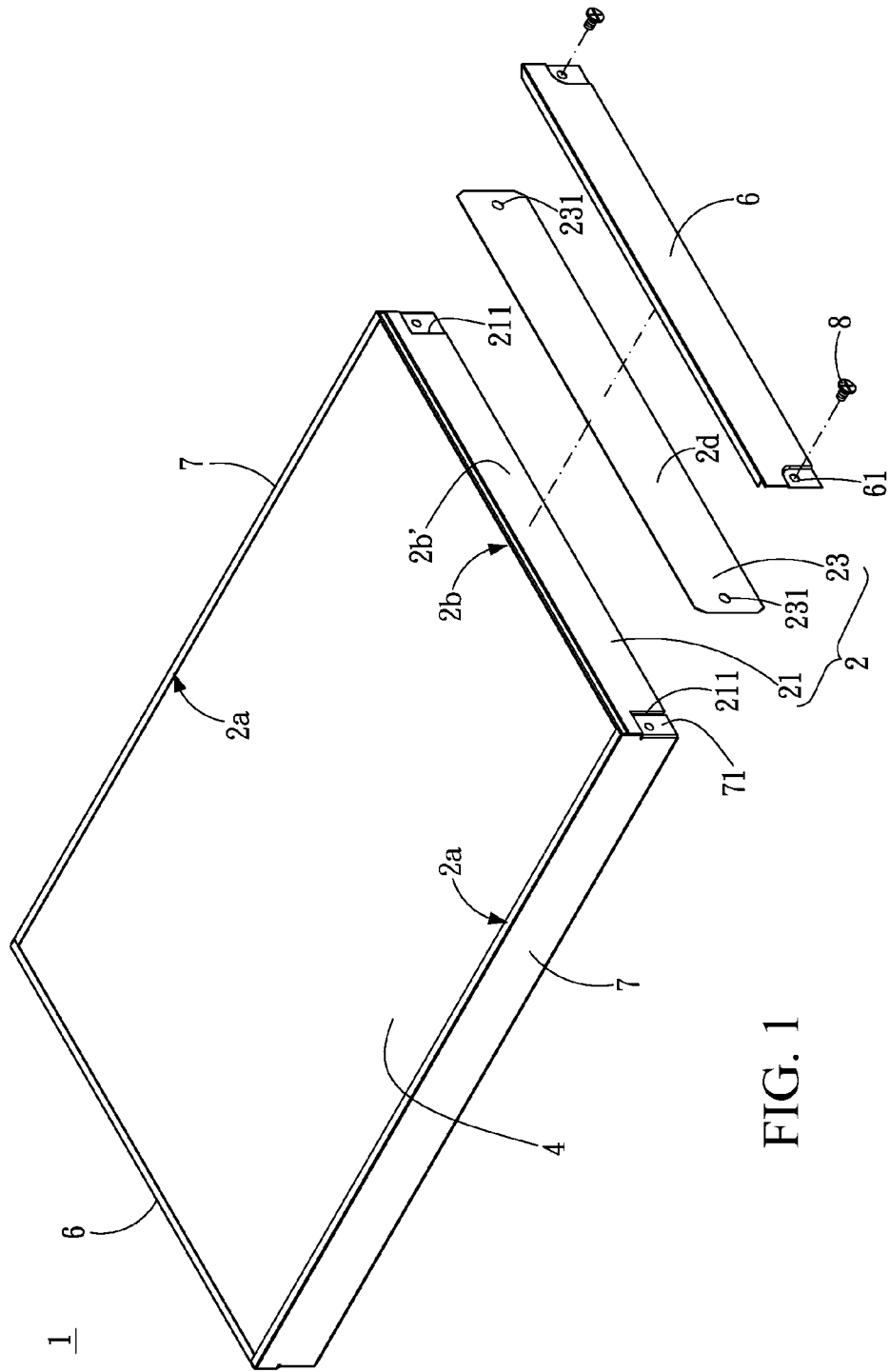
FIG. 1 is a schematic exploded view of a first embodiment.
Figure 2A:
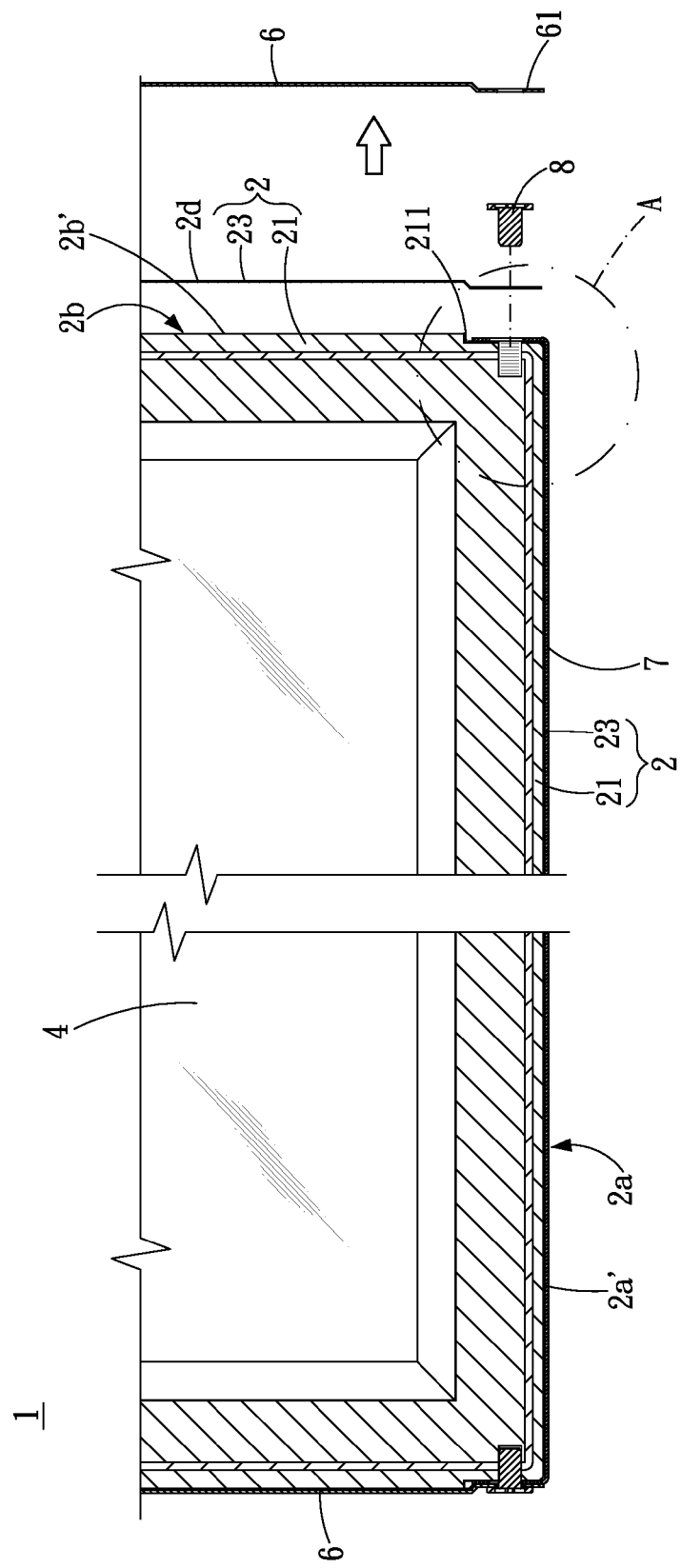
FIG. 2A is a schematic, cross-sectional top view of the first embodiment.

In FIGS. 1, 2A and 3, a display of the first embodiment is illustrated; wherein FIG. 1 is a schematic exploded view, FIG. 2A is a schematic, cross-sectional top view and FIG. 3 is an enlarged view of portion A in FIG. 2A.

As shown in the drawings, display 1 of the first embodiment includes frame component 2, display module 4, first outer frame 6 and second outer frame 7.

Figure 2B:
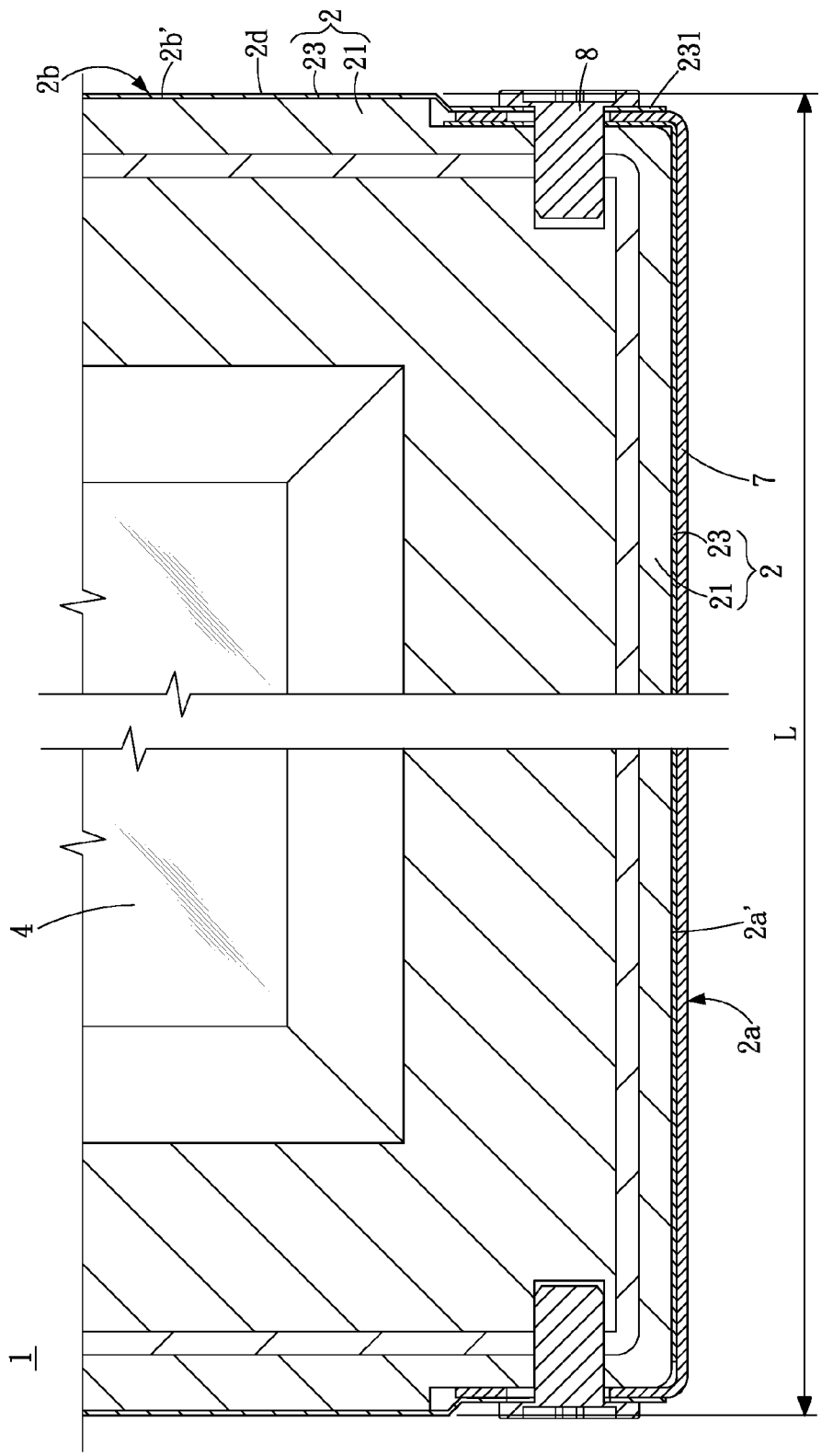
FIG. 2B is a schematic view (1) of the first embodiment, in which a tiled length is illustrated.
Figure 2C:
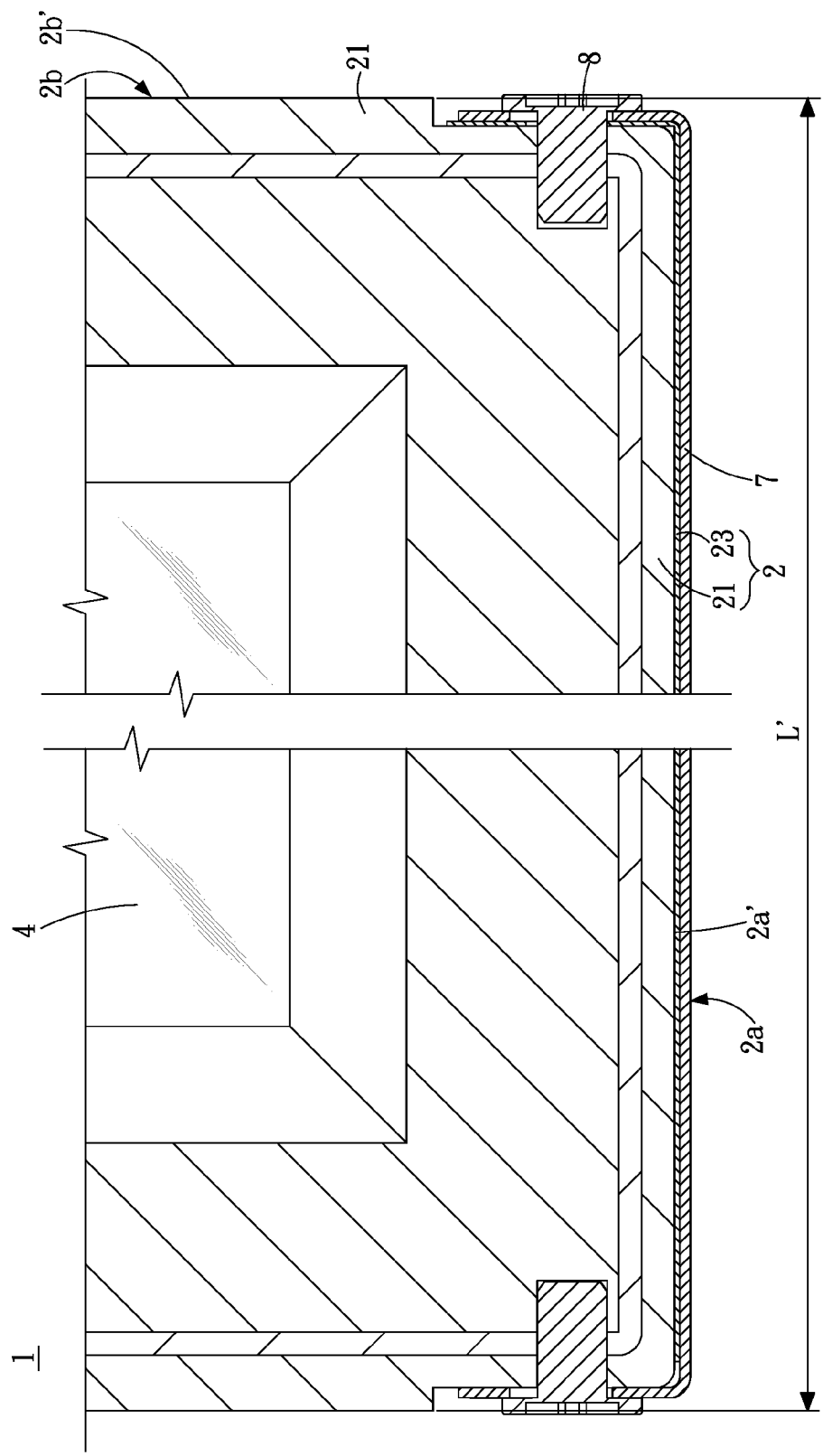
FIG. 2C is a schematic view (2) of the first embodiment, in which a tiled length is illustrated.

Frame component 2 includes frame body 21 and protection piece 23. In an embodiment protection piece 23 includes an adhesive layer (not shown), so that protection piece 23 is able to be attached to a lateral surface of frame body 21. In the present embodiment, frame body 21 is a rectangular hollow structure; which is able to be formed by plastic materials in another embodiment. Frame body 21 is adapted to support display module 4. In the drawings, frame body 21 covers around the perimeter of display module 4, which is therefore not shown as a hollow structure. Furthermore, frame body 21 is not limited to a rectangular hollow structure. In an embodiment protection piece 23 is an isolation film, such as polyester thin film (Mylar). In addition, frame component 2 includes a first side 2a and a second side 2b, and frame body 21 includes a first surface 2a' and a second surface 2b', with the first surface 2a' corresponding to the first side 2a, and the second surface 2b' corresponding to the second side 2b. Frame component 2 includes a tiled length L, as shown in FIG. 2B. In an embodiment tiled length L is a sum of the length of the first surface 2a' on frame body 21 and the thickness of protection piece 23. As shown in FIG. 2C, in an embodiment the lateral surface of frame body 21 is not attached with protection piece 23; here tiled length L' is the length of the first surface 2a' on frame body 21.

Display module 4 is configured on frame body 21 of frame component 2; with its lateral side being clamped by frame body 21, display module 4 is positioned on frame body 21. In an embodiment display module 4 is a flat panel display, such as Liquid Crystal Display (LCD), Thin Film Transistor (TFT)

display, Organic Light Emitting Diode (OLED) display and etc. In the present disclosure, detail components included on display module 4 are not specifically limited. In addition, in an embodiment protection piece 23 is able to be partially attached to the lateral surface of frame body 21, and in the meantime partially attached at the perimeter of display module 4, thereby strengthening the intensity of positioning display module 4 by frame body 21.

First outer frame 6 is strip shaped, configured at the second side 2b of frame component 2. In an embodiment first outer frame 6 is made of materials with high rigidity, such as metal; yet the disclosure is not to be limited to such an example.

The second outer frame 7 is configured on the first side 2a of frame component 2. In an embodiment second outer frame 7 is made of materials with high rigidity, such as metal; yet the disclosure is not to be limited to such an example. In an embodiment the length of second outer frame 7 is shorter than tiled length L or L' (as shown in FIG. 2B and FIG. 2C). The two sides of second outer frame 7 are therefore adapted without exceeding the two ends of the first side 2a. Here the ends of the first side 2a means the edge surface 2d of frame body 21 at the second side 2b; specifically, the two sides of the second outer frame 7 are adapted without exceeding the edge surface 2d of the second side 2b. In an embodiment according actual requirements of structure design, the length of the second outer frame 7 is able to be equal to the tiled length; specifically the two sides of the second outer frame 7 are aligned perfectly along the edge surface 2d of the second side 2b. In other words, as long as the two sides of the second outer frame 7 do not exceed the two ends of the first side 2a; the length of the second outer frame 7 is not otherwise limited. In an embodiment the second outer frame 7 has an inserting part 71 at its two ends. When the second outer frame 7 is configured at the first side 2a of frame component 2, inserting part 71 is inserted between the first outer frame 6 and frame body 21; however, the disclosure is not otherwise limited. The structure of the second outer frame 7 is possible to be the same as the first outer frame 6.

In an embodiment the two lateral ends of frame body 21 at the second surface 2b has first recesses 211 with recessed shapes; and first recess 211 is located at the junction between the first side 2a and the second side 2b. Here the first outer frame 6 has second recess 61 located at its two ends, which corresponds to the first recesses 211. When the first outer frame 6 is configured at the second side 2b, the second recess 61 is disposed onto the first recess 211. Furthermore, protection piece 23 has two extended portions 231 located at its two ends, which corresponds to first recesses 211. When protection piece 23 is attached to the second side 2b, extended portions 231 are attached to the first recessed 211. Here, inserting part 71 of the second outer frame 7 is inserted inside first recess 211 without exceeding the edge surface 2d of frame body 21 at the second side 2b (as shown in FIG. 3); specifically, the two sides of the second outer frame 7 are adapted without exceeding edge surface 2d of the second side 2b. In other words, inserting part 71 of the second outer frame 7 is adapted without exceeding the two ends of the first side 2a.

Furthermore, when the first outer frame 6 and the second outer frame 7 cover to surround frame component 2, through positioning element 8 the first outer frame 6 and the second outer frame 7 is able to be positioned on frame component 2. When the first outer frame 6 is removed, positioning element 8 may still be used to position the second outer frame 7 on frame component 2. In an embodiment positioning element 8 is a screw for fastening the first outer frame 6 and the second outer frame 7 on frame component 2; yet the disclosure is not otherwise limited.

Figure 4:
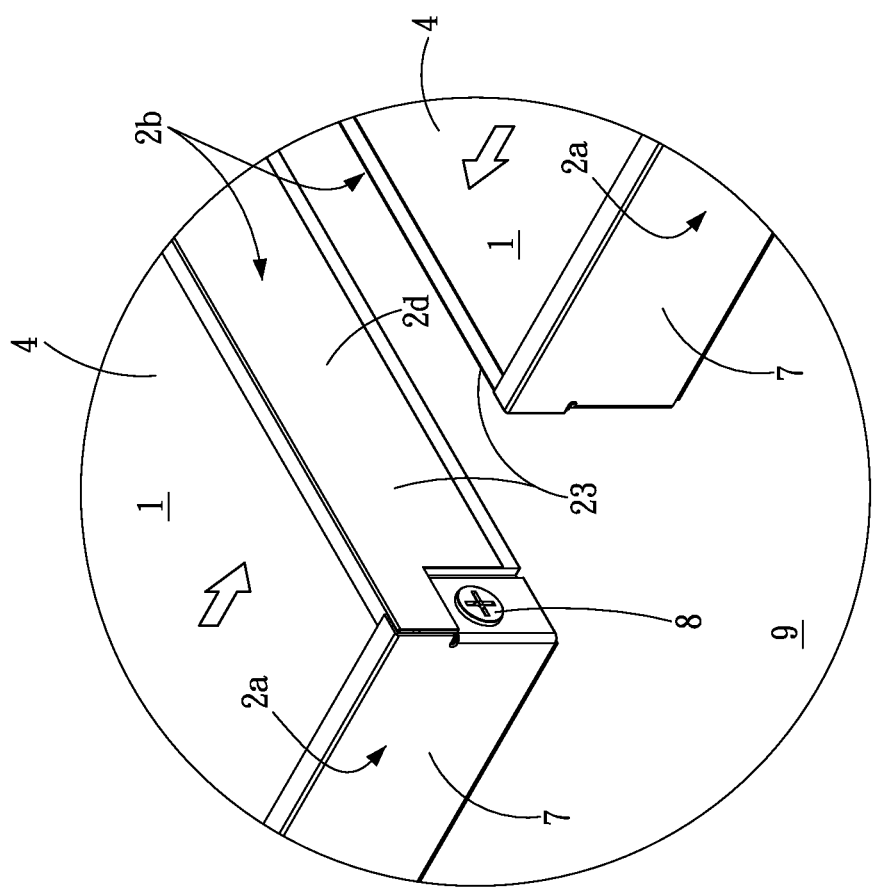
FIG. 4 is a perspective view of the first embodiment during connecting operation.
Figure 5:
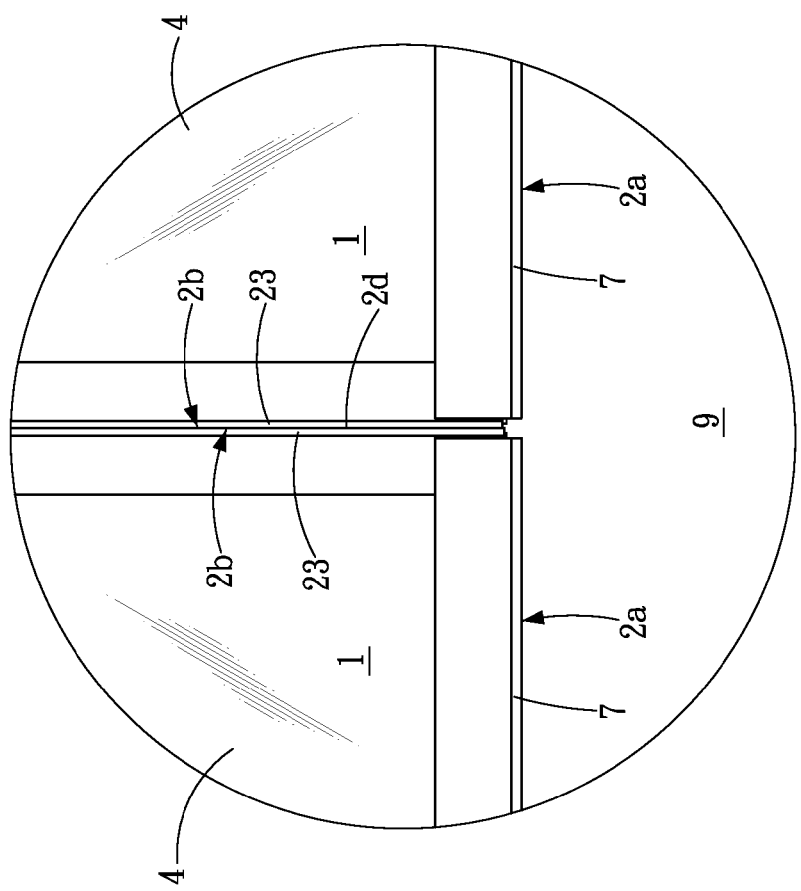
FIG. 5 is a schematic top view of the first embodiment after connecting operation.
Figure 6:
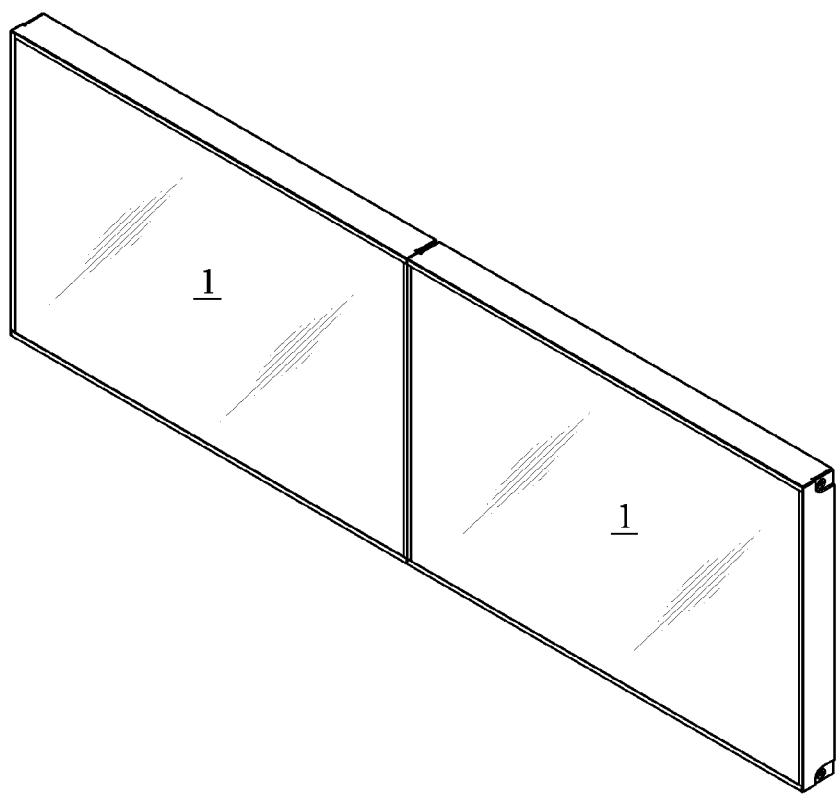
FIG. 6 is a perspective view of the first embodiment after connecting operation.

During transportation, the first outer frame 6 and the second outer frame 7 are adapted to protect display module 4. To connect multiple displays 1 to form a display assembly 9, the first outer frame 6 at the second side 2b is able to be removed to achieve a narrow border effect. Please refer to FIGS. 4, 5 and 6, which are schematic views of the first embodiment regarding connecting operation. Here an example is used for explanation: forming display assembly 9 from two displays 1; but the disclosure is not otherwise limited. During connecting two displays 1, positioning elements 8 are removed respectively and then the first outer frame 6 is removed as well. Subsequently, positioning element 8 is used to position the second outer frame 7 on the frame component 2. At this time the first side 2a of frame component 2 is covered by the second outer frame 7, yet the second side 2b is not covered by the first outer frame 6 so that the protection piece 23 is exposed. Next, the two displays 1 with first outer frames 6 removed are connected adjacently. Since the two sides of the second outer frame 7 is adapted without exceeding the two ends of the first side 2a, specifically the two sides of the second outer frame 7 are adapted without exceeding the edge surface 2d of the second side 2b, the corresponding second sides 2b of the two displays 1 are able to lean close to each other and the first recesses 211 of the two displays 1 are now placed adjacent and corresponding to each other to form display assembly 9. Since two first outer frames 6 between the two displays 1 of display assembly 9 are omitted, two times of the thickness of the first outer frame 6 are reduced to achieve a narrow border advantage. For example, if the thickness of the first outer frame 6 is 0.6 mm, then the narrowest border of display 1 is able to be reduced from 7.0 mm to 5.8 mm; which means 1.2 mm thickness is saved and overall the thickness is reduced by 17% (1.2 mm÷7.0 mm≈0.17) less than the original frame border.

Figure 7:
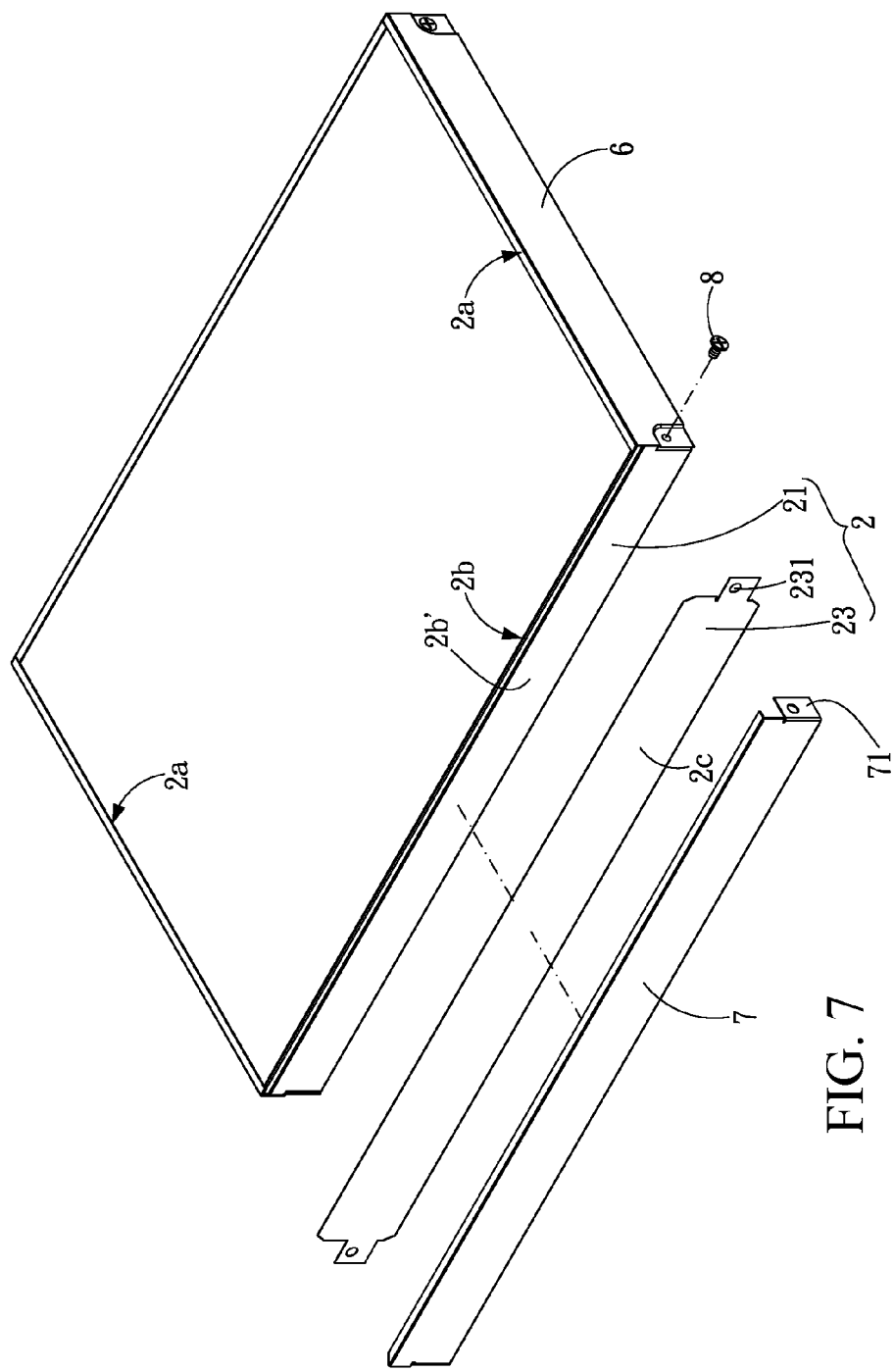
FIG. 7 is a schematic exploded view of a second embodiment.
Figure 8:
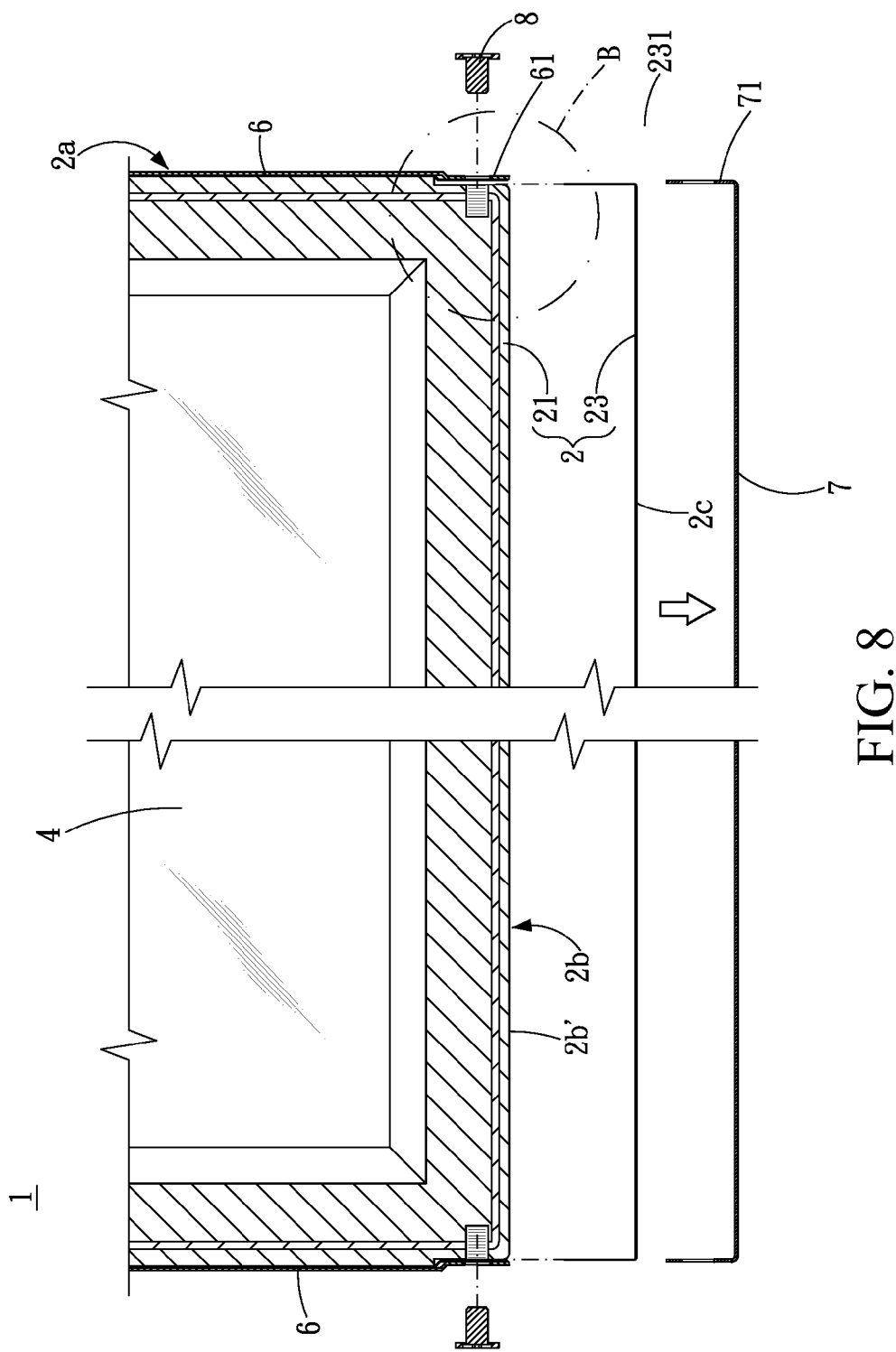
FIG. 8 is a schematic, cross-sectional top view of the second embodiment.
Figure 9:
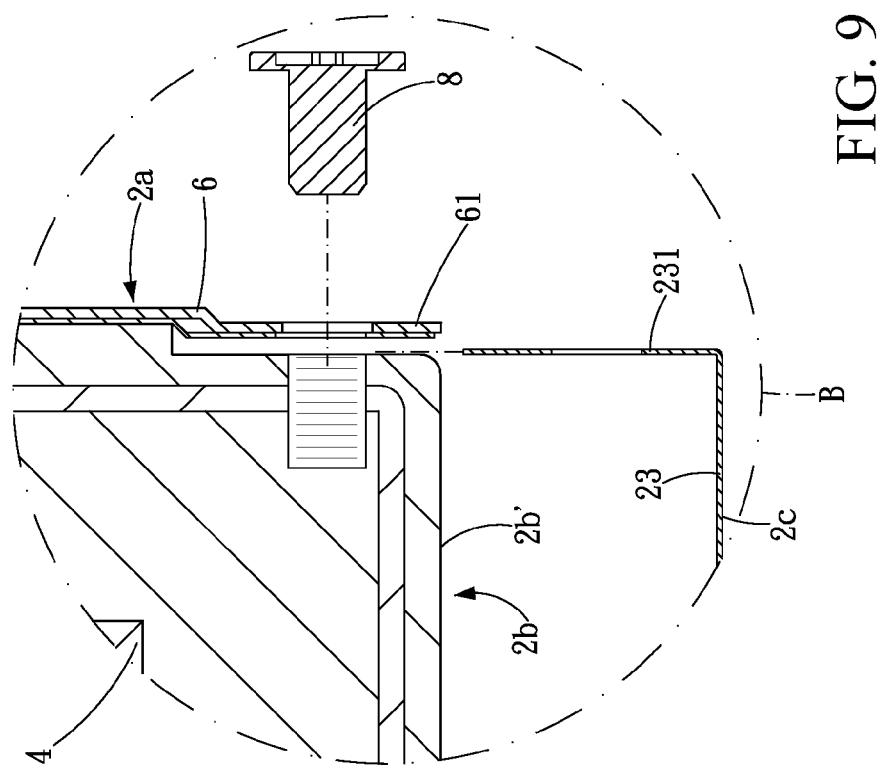
FIG. 9 is an enlarged view of portion B in FIG. 8.

Please refer to FIGS. 7, 8 and 9, which are drawings regarding the display according to the second embodiment; FIG. 7 is a schematic exploded view; FIG. 8 is a schematic, cross-sectional top view; FIG. 9 is an enlarged view of portion B in FIG. 8. The differences between the second embodiment and the first embodiment are as follows. In the first embodiment, during connecting displays 1, the first outer frame 6 is removed; in the second embodiment, the second outer frame 7 is removed. In the second embodiment, the first outer frame 6 is configured at the first side 2a of frame component 2, while the second outer frame 7 is configured at the second side 2b of the frame component 2. Since the length of first outer frame 6 is shorter than the length of the first side 2a, the two sides of the first outer frame 6 does not exceed the two ends of the first side 2a. Here, the two ends of the first side 2a means edge surface 2c of frame component 2 at the second side 2b; specifically the two sides of the first outer frame 6 are adapted without exceeding the edge surface 2c of the second side 2b. According to actual requirements of structure design, the length of the first outer frame 6 is able to be equal to the length of the first side 2a. Specifically the two sides of the first outer frame 6 are aligned perfectly along the edge surface 2c of the second side 2b. In other words, as long as the two sides of the first outer frame 6 do not exceed the two ends of the first side 2a; the length of the second outer frame 7 is not otherwise limited.

In an embodiment when the first outer frame 6 is configured at the second side 2b, the second recess 61 is then configured inside first recess 211 without exceeding the edge surface 2c of frame body 21 at the second side 2b (as shown in FIG. 9); specifically, the two sides of the first outer frame 6 do not exceed the edge surface 2c of the second side 2b. In other words, the first outer frame 6 does not exceed the two ends of the first side 2a.

Figure 10:
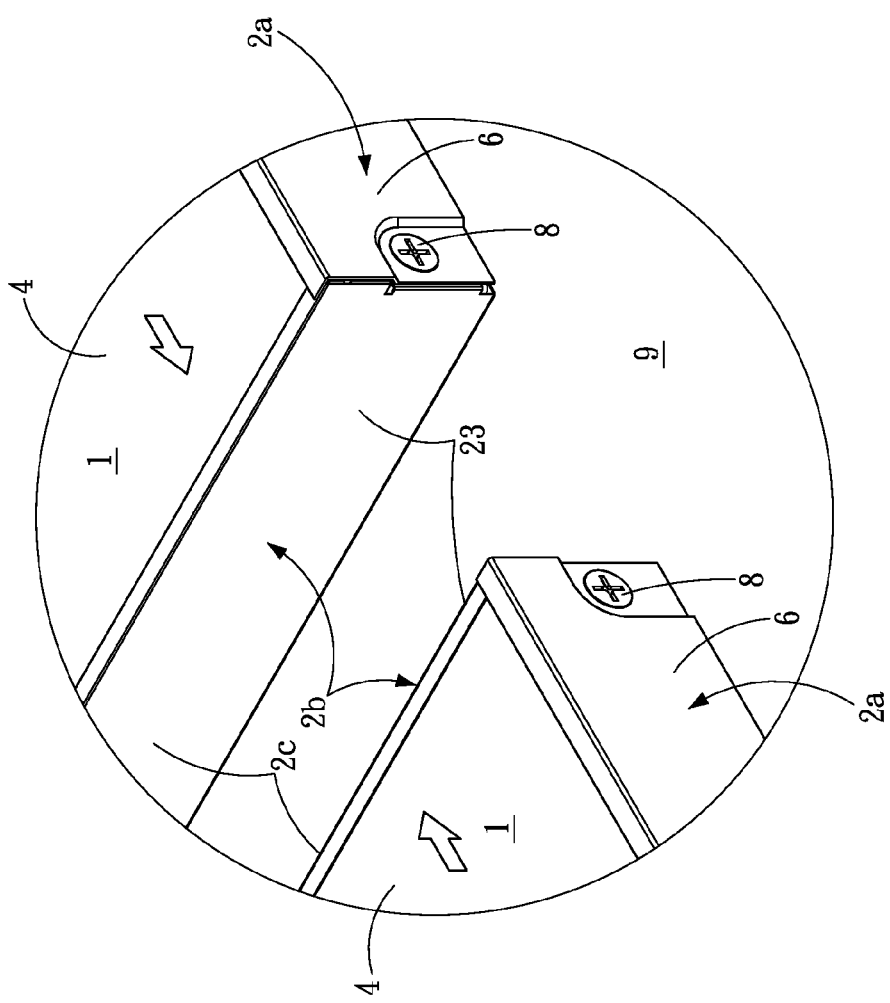
FIG. 10 is a perspective view of the second embodiment during connecting operation.
Figure 11:
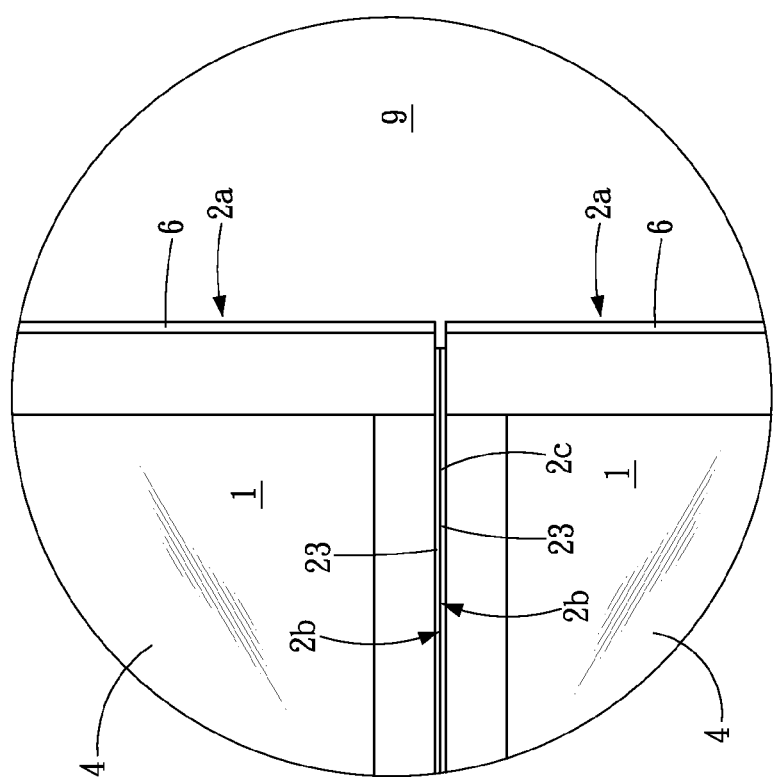
FIG. 11 is a schematic top view of the second embodiment after connecting operation.
Figure 12:
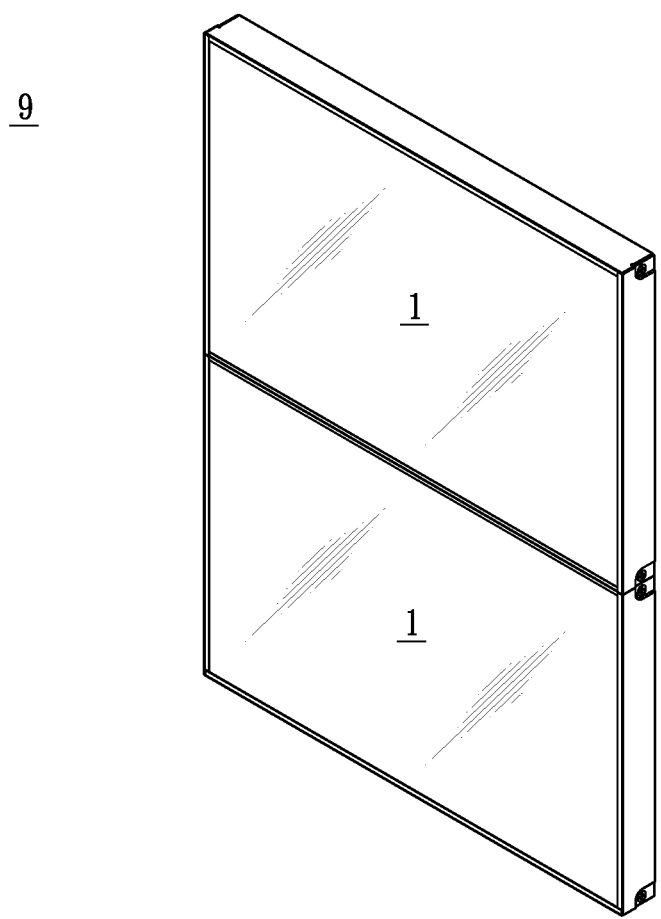
FIG. 12 is a perspective view of the second embodiment after connecting operation.

When connecting multiple displays 1 to form a display assembly 9, the second outer frame 7 of the second side 2b is able to be removed to achieve a narrow border effect. Please refer to FIGS. 10, 11 and 12, which are schematic views of the second embodiment regarding connecting operation. During connecting two displays 1, positioning elements 8 are removed respectively and then the second outer frame 7 is removed as well. Subsequently, positioning element 8 is used to position the first outer frame 6 on frame component 2. At this time, the first side 2a of frame component 2 is covered by the first outer frame 6, yet the second side 2b is not covered by the second outer frame 7 so that protection piece 23 is exploded. Next, the two displays 1 with the second outer frame 7 removed are connected adjacently. Since the two sides of the first outer frame 6 do not exceed the two ends of the first side 2a, specifically the two sides of the first outer frame 6 are adapted without exceeding the edge surface 2c of the second side 2b, the corresponding second sides 2b of the two displays 1 are able to lean close to each other, and the first recesses 211 of the two displays 1 are now placed adjacent and corresponding to each other to form display assembly 9. Since two second outer frames 7 between the two displays 1 of display assembly 9 are omitted, two times of the thickness of the second outer frame 7 is reduced to achieve a narrow border advantage.

Figure 13:
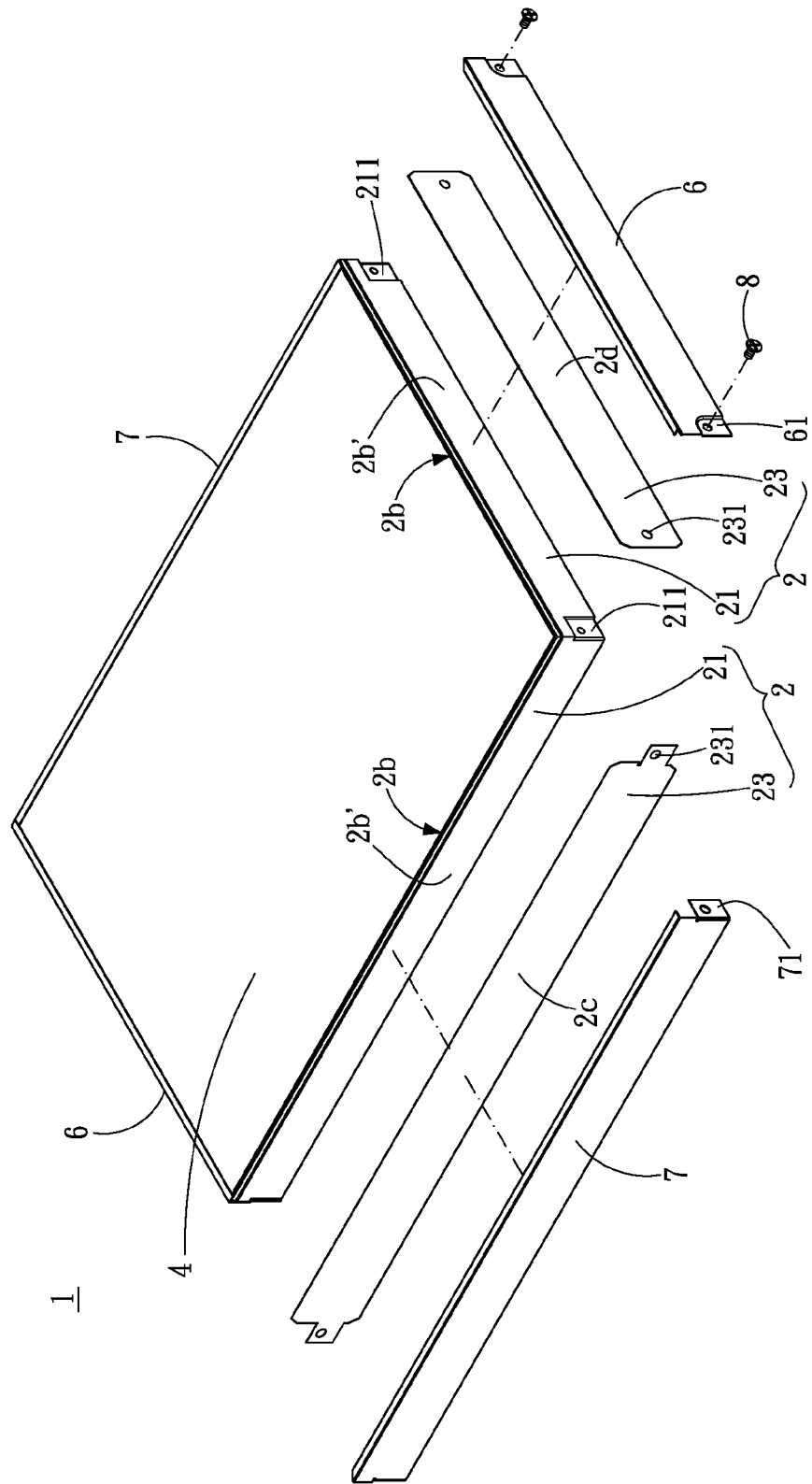
FIG. 13 is a schematic exploded view of a third embodiment.
Figure 14:
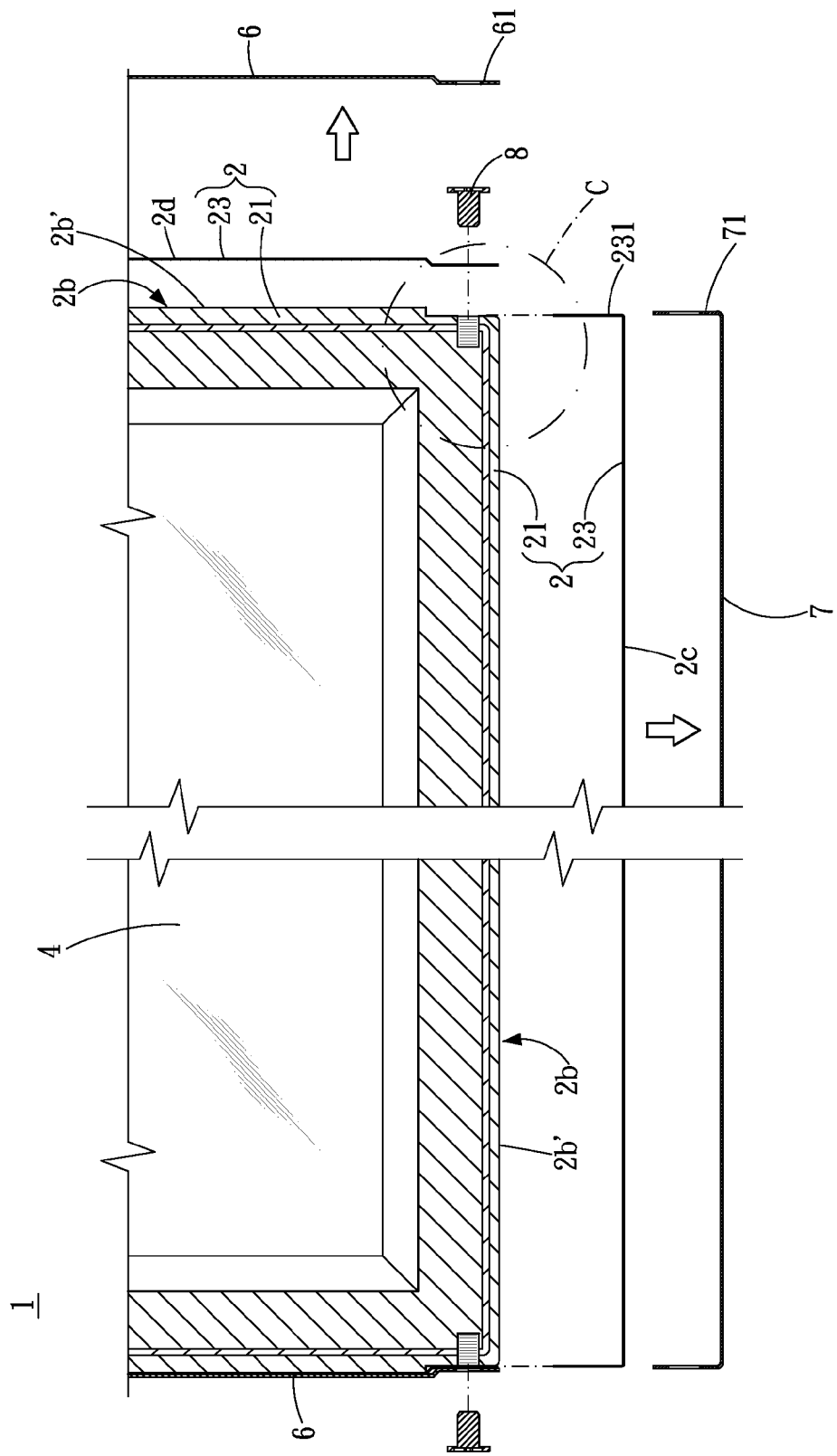
FIG. 14 is a schematic, cross-sectional top view of the third embodiment.
Figure 15:
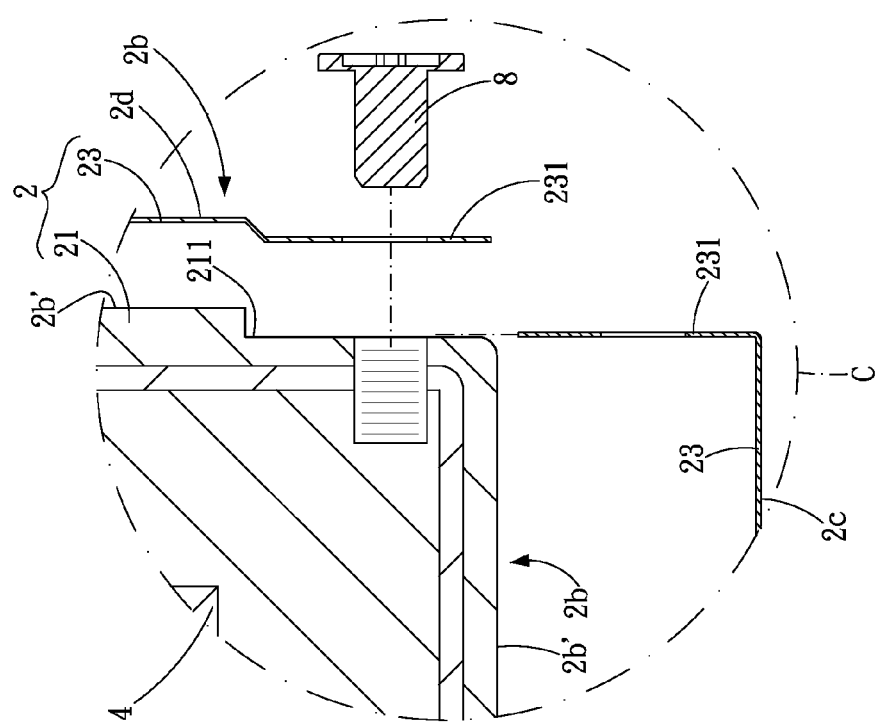
FIG. 15 is an enlarged view of portion C in FIG. 14.

Please refer to FIGS. 13, 14 and 15, which are drawings regarding the display according to the second embodiment. FIG. 13 is a schematic exploded view; FIG. 14 is a schematic, cross-sectional top view; FIG. 15 is an enlarged view of portion C in FIG. 14. The differences between the third embodiment and the former two embodiments are as follows. In the third embodiment, the first outer frame 6 and the second outer frame 7 are able to be removed at the same time. In the third embodiment, the two adjacent sides of frame component 2 are the second sides 2b, and the other two adjacent sides are the first side 2a. One second side 2b is substantially configured in parallel to one first side 2a, and the other second side 2b is substantially configured in parallel to the other first side 2a. One second side 2b is configured with the first outer frame 6, and the other second side 2b is configured with the second outer frame 7. Here the length of the first outer frame 6 is shorter than the tiled length; specifically the two sides of the first outer frame 6 do not exceed the two ends of the first side 2a that is in parallel to the position of the first outer frame 6. The end of the first side 2a means the edge surface 2c of frame body 21 at the second side 2b. In other words, the two sides of the first outer frame 6 are configured inside first recesses 211 without exceeding the edge surface 2c of frame body 21 at the second side 2b. The length of the first outer frame 6 is able to be equal to the tiled length. Specifically, as long as the two sides of the first outer frame 6 are configured inside first recesses 211 without exceeding the two ends of the first side 2a that is configured in parallel to the first outer frame 6, the length of the first outer frame 6 is not otherwise limited. The length of the second outer frame 7 is shorter than the tiled length; specifically the two sides of the second outer frame 7 do not exceed the two ends of the first side 2a that is in parallel to the second outer frame 7. The ends of the first side 2a mean the edge surface 2d of frame body 21 at the second side 2b. Specifically the two sides of the second outer frame 7 are configured inside first recesses 211 without exceeding the edge surface 2d of the second side 2b. The length of the second outer frame 7 is able to be equal to the tiled length. In other words, as long as the two sides of the second outer frame 7 are configured inside first recesses 211 without exceeding the two ends of the first side 2a that is configured in parallel to the second outer frame 7, the length of the second outer frame 7 is not otherwise limited.

Figure 16:
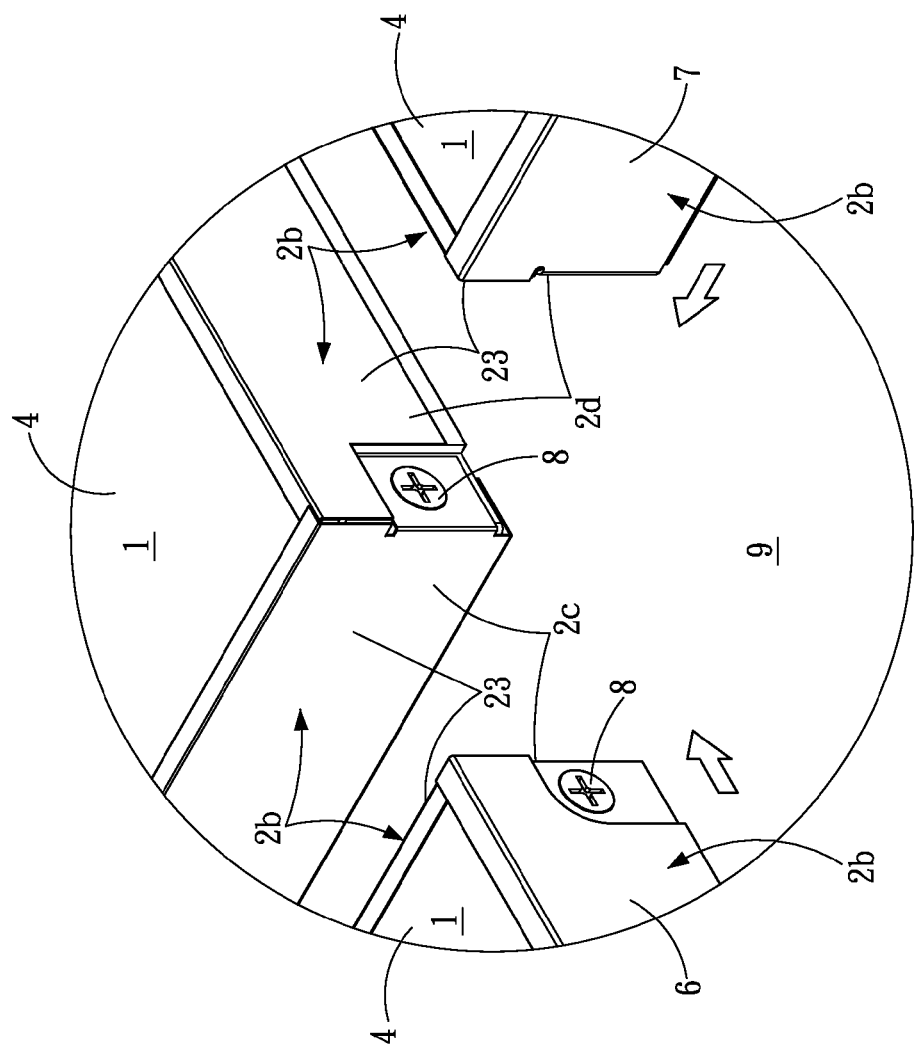
FIG. 16 is a perspective view of the third embodiment during connecting operation.
Figure 17:
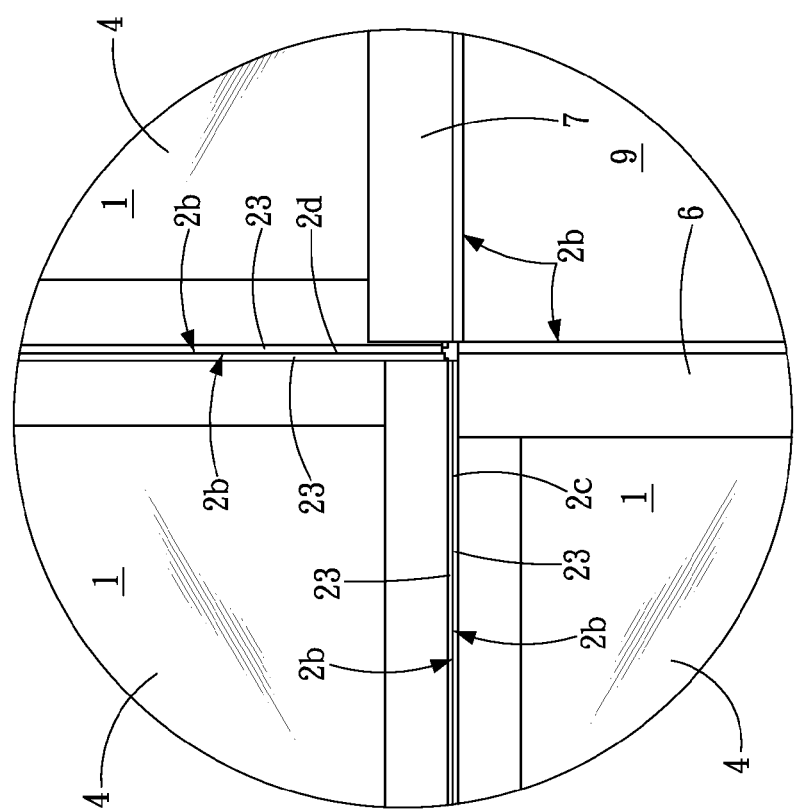
FIG. 17 is a schematic top view of the third embodiment after connecting operation.
Figure 18:
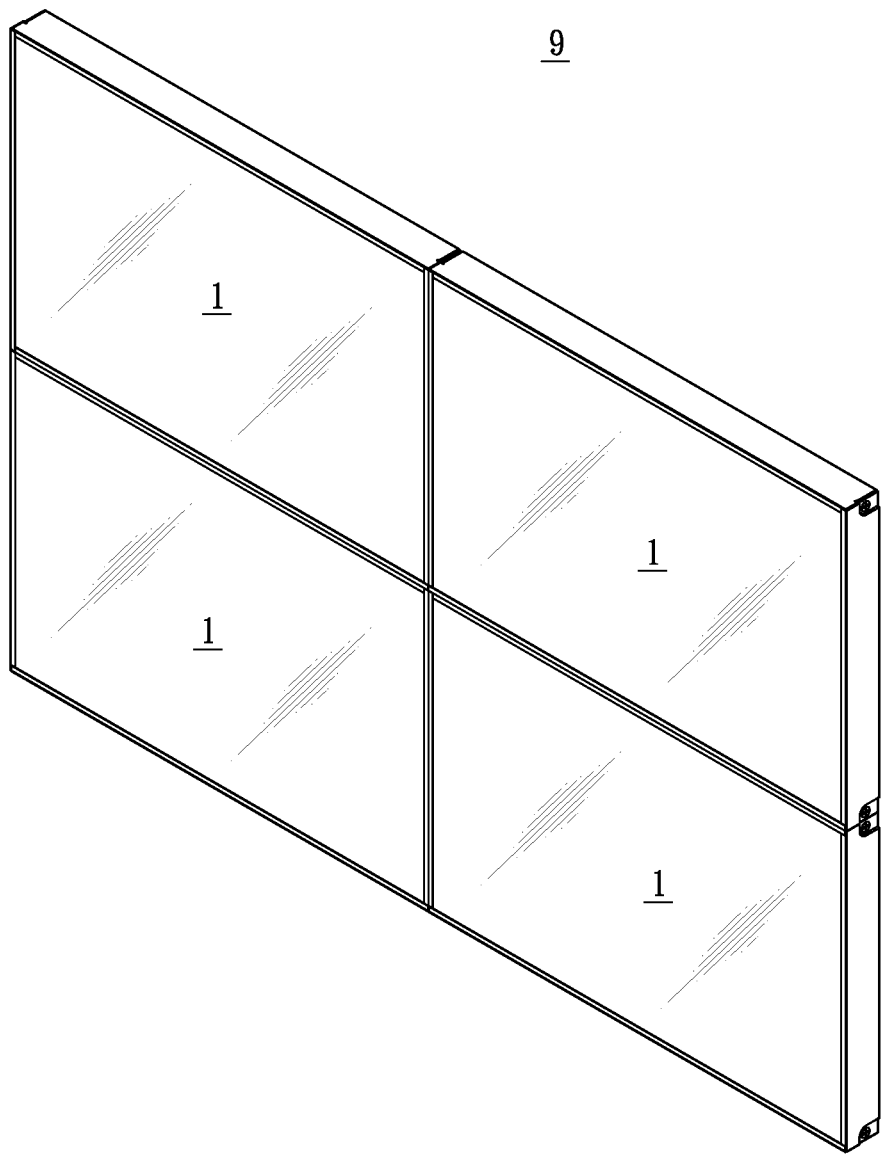
FIG. 18 is a perspective view of the third embodiment after connecting operation.

Please refer to FIGS. 16, 17 and 18, which are schematic views of the third embodiment regarding connecting operation. When connecting multiple displays 1 to form a display assembly 9, the first outer frame 6 on the second side 2b and the second outer frame 7 on the first side 2a are both able to be removed and achieve a narrow border effect. Since the removal procedures are similar to those of the former embodiments described previously, further explanations are omitted here. In FIGS. 16, 17 and 18, an example of forming the display assembly 9 by connecting 4 displays 1 is used here for explanatory purposes only. To illustrate a clear connecting status, only three displays 1 are shown in FIGS. 16 and 17, and four displays 1 shown in FIG. 18 has formed the display assembly 9.

During transportation, the first outer frame and the second outer frame are used to protect the display module. When connecting multiple displays into a larger display assembly, removing the first outer frame or the second outer frame at the second side is able to effectively reduce the thickness between two adjacent displays. Specifically, in above embodiments the display assembly is able to reduce two times the thickness of the first outer frame or the second outer frame and achieve the narrow border effect. Furthermore, the user is able to remove the first outer frame or the second outer frame respectively according to the actual connecting requirements. As a result, the disclosed displays benefit from greater flexibility and variety of positioning during the connecting operation.

While the disclosure has been described by the way of example and in terms of the embodiments, it is to be understood that the disclosure need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A display, comprising:
a frame component with a first side and a second side, the second side comprises a first recess located at a lateral end thereof, wherein the first recess is a concaved portion at the lateral end formed by cutting out part of an end of the second side, wherein the first recess comprises a flat surface with a screw hole for a positioning element, wherein the first side is a flat surface, wherein the second side excluding the first recess is a flat surface, wherein the first side is perpendicular to the second side;
a display module configured within the frame component;
a first removable outer frame configured at the second side of the frame component, wherein when two displays are connected to each other along the corresponding two second sides of the two displays, the corresponding two first outer frames are removed; and
a second outer frame configured at the first side of the frame component, the second outer frame comprises a main part and an inserting part at a lateral end thereof, wherein the main part is perpendicular to the inserting part and the inserting part inserts and fits into the first recess of the second side such that length of the second outer frame is shorter than or equal to length of the first side, so the two displays are directly connected to each other along the two flat surfaces of the corresponding two second sides to achieve a narrow boarder effect.

2. The display according to claim 1, wherein the frame component comprises a frame body, the frame body having a first surface and a second surface with the first surface corresponding to the first side and the second surface corresponding to the second side;
wherein the second outer frame comprises an upper part and a bottom part, the length of the upper part is equal to the length of the first side, the length of the bottom part is shorter than the length of the first side;
wherein the inserting part is located at an end of the bottom part of the second outer frame.

3. The display according to claim 2, wherein the frame component further comprises a protection piece configured on the second surface of the frame body, the length of the second outer frame being a sum of the length of the first surface on the frame body and the thickness of the protection piece, wherein the protection piece comprises an extended portion located at an end, the extended portion corresponds to the first recess and comprises a hole for the positioning element.

4. The display according to claim 1, wherein the first outer frame comprises a second recess located at a position corresponding to the first recess, the second recess comprises a hole for the positioning element.

5. A display assembly, comprising:
a plurality of displays, each of the displays comprising:
a frame component with a first side and a second side the second side comprises a first recess located at a lateral end thereof, wherein the first recess is a concaved portion at the lateral end formed by cutting out part of an end of the second side, wherein the first recess comprises a flat surface with a screw hole for a positioning element, wherein the first side is a flat surface, wherein the second side excluding the first recess is a flat surface, wherein the first side is perpendicular to the second side;
a display module configured within the frame component;
a first removable outer frame configured at the second side of the frame component, wherein when two displays are connected to each other along the corresponding two second sides of the two displays, the corresponding two first outer frames are removed; and
a second outer frame configured at the first side of the frame component, the second outer frame comprises a main part and an inserting part at a lateral end thereof, wherein the main part is perpendicular to the inserting part and the inserting part inserts and fits into the first recess of the second side such that a length of the second outer frame is shorter than or equal to a length of the first side, so the two displays are directly connected to each other along the two flat surfaces of the corresponding two second sides to achieve a narrow boarder effect.

6. The display assembly according to claim 5, wherein the frame component comprises a frame body comprises a first surface and a second surface with the first surface corresponding to the first side and the second surface corresponding to the second side.

7. The display assembly according to claim 6, wherein the frame component further comprises a protection piece configured on the second surface of the frame body, the length of the second outer frame being a sum of the length of the first surface on the frame body and the thickness of the protection piece, wherein the protection piece comprises an extended portion located at an end, the extended portion corresponds to the first recess and comprises a hole for the position element.

8. The display assembly according to claim 5, wherein the first outer frame comprises a second recess located at a position corresponding to the first recess, the second recess comprises a hole for the positioning element.

9. A display, comprising:
a frame component with a first side and a second side, the second side comprises a first recess located at a lateral end thereof, wherein the first recess is a concaved portion at the lateral end formed by cutting out part of an end of the second side, wherein the first recess comprises a flat surface with a screw hole for a positioning element, wherein the first side is a flat surface, wherein the second side excluding the first recess is a flat surface, wherein the first side is perpendicular to the second side;
a display module configured within the frame component;
a first removable outer frame configured at the second side of the frame component; and
a second outer frame configured at the first side of the frame component, the second outer frame comprises a main part and an inserting part at a lateral end thereof, wherein the main part is perpendicular to the inserting part and the inserting part inserts and fits into the first recess of the second side such that a length of the second outer frame is shorter than or equal to a length of the first side;
wherein when two displays are connected to each other along the corresponding two first sides of the two displays, the corresponding two second outer frames are removed so the two displays are directly connected to each other along the two flat surfaces of the corresponding two first sides to achieve a narrow boarder effect.

10. The display according to claim 9, wherein the frame component comprises a frame body, the frame body comprising a first surface and a second surface with the first surface corresponding to the first side and the second surface corresponding to the second side.

11. The display according to claim 10, wherein the frame component further comprises a protection piece configured on the first surface of the frame body, wherein the protection piece comprises an extended portion located at an end, the extended portion corresponds to the inserting part and comprises a hole for the positioning element.

12. The display according to claim 9, wherein the inserting part of the second outer frame is inserted into the first recess.

* * * * *